(12) United States Patent
Spitz

(10) Patent No.: US 10,816,063 B2
(45) Date of Patent: Oct. 27, 2020

(54) WORK VEHICLE HAVING IMPLEMENT

(71) Applicant: KUBOTA CORPORATION, Osaka (JP)

(72) Inventor: David Spitz, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 69 days.

(21) Appl. No.: 16/134,097

(22) Filed: Sep. 18, 2018

(65) Prior Publication Data

US 2020/0088270 A1    Mar. 19, 2020

(51) Int. Cl.

| | |
|---|---|
| *B60W 10/04* | (2006.01) |
| *B60W 10/30* | (2006.01) |
| *B60W 50/02* | (2012.01) |
| *F16H 7/08* | (2006.01) |
| *B60K 17/28* | (2006.01) |
| *B60K 23/00* | (2006.01) |
| *F16H 7/12* | (2006.01) |
| *A01D 34/00* | (2006.01) |
| *A01D 34/76* | (2006.01) |
| *A01D 101/00* | (2006.01) |
| *A01D 34/66* | (2006.01) |

(52) U.S. Cl.
CPC ......... *F16H 7/0827* (2013.01); *A01D 34/006* (2013.01); *B60K 17/28* (2013.01); *B60K 23/00* (2013.01); *F16H 7/1281* (2013.01); *A01D 34/66* (2013.01); *A01D 34/76* (2013.01); *A01D 2101/00* (2013.01); *F16H 2007/0865* (2013.01); *F16H 2007/0885* (2013.01); *F16H 2007/0893* (2013.01)

(58) Field of Classification Search
CPC .... A01D 34/006; B60W 10/04; B60W 10/30; B60W 2050/0295; B60W 50/035; B60W 2710/021
See application file for complete search history.

(56) References Cited

U.S. PATENT DOCUMENTS

| | | | |
|---|---|---|---|
| 8,991,143 B2 | 3/2015 | Fujiwara et al. | |
| 9,894,827 B2 * | 2/2018 | Kato | A01B 71/02 |
| 2017/0240159 A1 * | 8/2017 | Foster | B60K 17/28 |

* cited by examiner

*Primary Examiner* — Sherry L Estremsky
(74) *Attorney, Agent, or Firm* — Greenblum & Bernstein, P.L.C.

(57) ABSTRACT

A work vehicle having an implement includes an engine control unit for controlling an engine and detecting an abnormal state of the engine, a PTO transmission mechanism for transmitting power from the engine to the implement, a PTO clutch for switching ON/OFF power transmission by the PTO transmission mechanism and a clutch control circuit configured to render the PTO clutch OFF based on a detection signal outputted by the engine control unit at time of detection of the abnormal state.

7 Claims, 5 Drawing Sheets

WORK VEHICLE HAVING IMPLEMENT

TECHNICAL FIELD

The present invention relates to a work vehicle including a traveling transmission mechanism for driving by power from an engine mounted on a vehicle body and a PTO transmission mechanism for transmitting the power from the engine to an implement (utility implement).

BACKGROUND

With such work vehicle as above, by appropriately coupling control for the engine and control for the implement, an effective work taking safety into consideration is made possible. For instance, a lawn mower disclosed in U.S. Pat. No. 8,991,143 includes an engine EU provided with an isochronous control section for constantly maintaining an engine rotational speed at a preset predetermined value independently of an engine load and a droop control section for varying the engine rotational speed in dependence on the engine load. Further, in its PTO transmission mechanism for transmitting engine power to a lawn cutting blade, there is incorporated a PTO clutch for switching ON/OFF the power transmission. When the PTO clutch is rendered ON, isochronous control is executed for the engine. When the PTO clutch is rendered OFF, droop control is effected for the engine. With this arrangement, the isochronous control is executed in response to an ON operation on a PTO clutch lever for carrying out a lawn cutting work, so that an engine rotational speed defined by an isochronous control characteristic map is maintained. As a result, a rotational speed advantageous for the lawn cutter blade will be maintained and an appropriate lawn cutting work will be effected. In this way, the coupling control between the engine and the PTO transmission mechanism is configured to vary the engine control in accordance with a state of the PTO transmission mechanism (implement). There is no disclosure regarding varying of the PTO transmission mechanism (implement) in accordance with a state of the engine. Further, in the control system such as the one disclosed in U.S. Pat. No. 8,991,143, a sensor ECU and the engine ECU are constituted of a microcomputer system, thus requiring cost for software, as well as cost for a measure to be taken for protection of the microcomputer and its peripheral devices that are vulnerable to exposure to rainwater, dust, etc.

In the case of a work vehicle according to U.S. Pat. No. 7,007,768, coupling control between engine assisting devices such as a starter, a fuel supplying unit and the PTO clutch is inexpensively provided by using an electric circuit including a relay switch. However, with this control system too, varying of the PTO transmission mechanism (implement) in accordance with a state of the engine is not contemplated.

SUMMARY OF THE INVENTION

An object of the present invention is to provide a work vehicle having an implement with the function of setting a PTO transmission mechanism to an appropriate state in accordance with a state of the engine in an inexpensive and maintenance-easy manner, without using a microcomputer more than necessary.

A work vehicle having an implement, according to the present invention comprises:

an engine;

an engine control unit for controlling the engine and detecting an abnormal state of the engine;

a traveling transmission mechanism for transmitting power from the engine to a traveling device;

a PTO transmission mechanism for transmitting power from the engine to the implement;

a PTO clutch for switching ON/OFF power transmission by the PTO transmission mechanism; and a clutch control circuit configured to render the PTO clutch OFF based on a detection signal outputted by the engine control unit at time of detection of the abnormal state.

With the above work vehicle, the clutch control circuit is configured to render the PTO clutch OFF, based on a detection signal outputted by the engine control unit at time of detection of the abnormal state. As the PTO clutch is rendered automatically OFF upon occurrence of the abnormal state in the engine, a work by the implement will be interrupted. As a result, a load applied from the implement is removed from the engine, so that fatal trouble of the engine can be avoided. Moreover, it is also possible to avoid deterioration in the quality of work which would occur if the implement were driven in spite of engine trouble.

According to one embodiment of the clutch control circuit, the clutch control circuit includes a clutch power supply line for supplying power for a clutch operation of the PTO clutch and a clutch switch incorporated in the clutch power supply line. This clutch switch blocks power supply by the clutch power supply line in response to a detection signal (detection signal indicative of the engine being at an abnormal state) outputted from the engine control unit. Advantageously, the clutch switch comprises a relay switch, and a coil of the relay switch is incorporated in a control line for transmitting the detection signal. With this, an inexpensive clutch control circuit can be realized.

DETAILED DESCRIPTION

Figure 1:
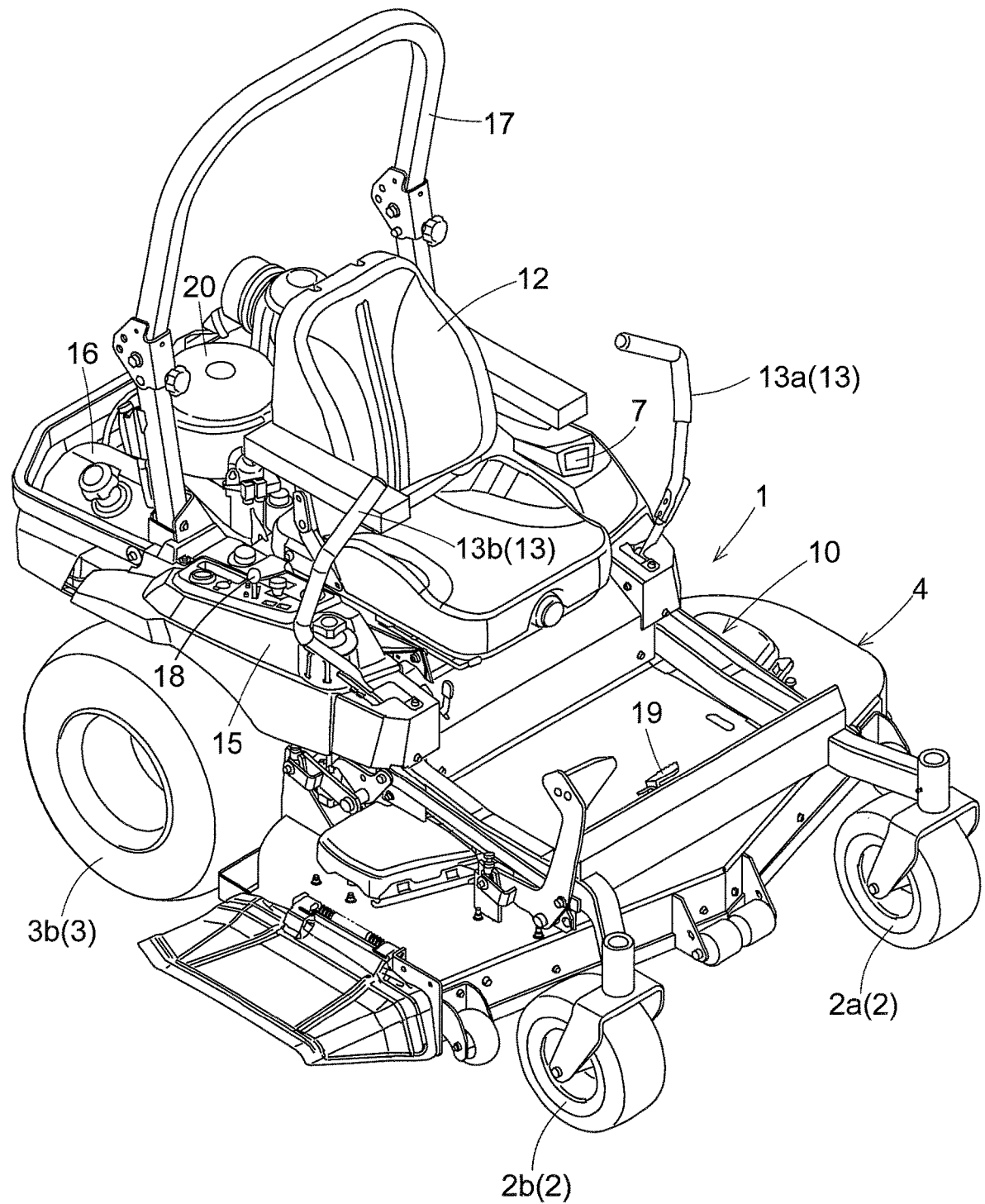
FIG. 1 is a perspective view of a grass mower.
Figure 2:
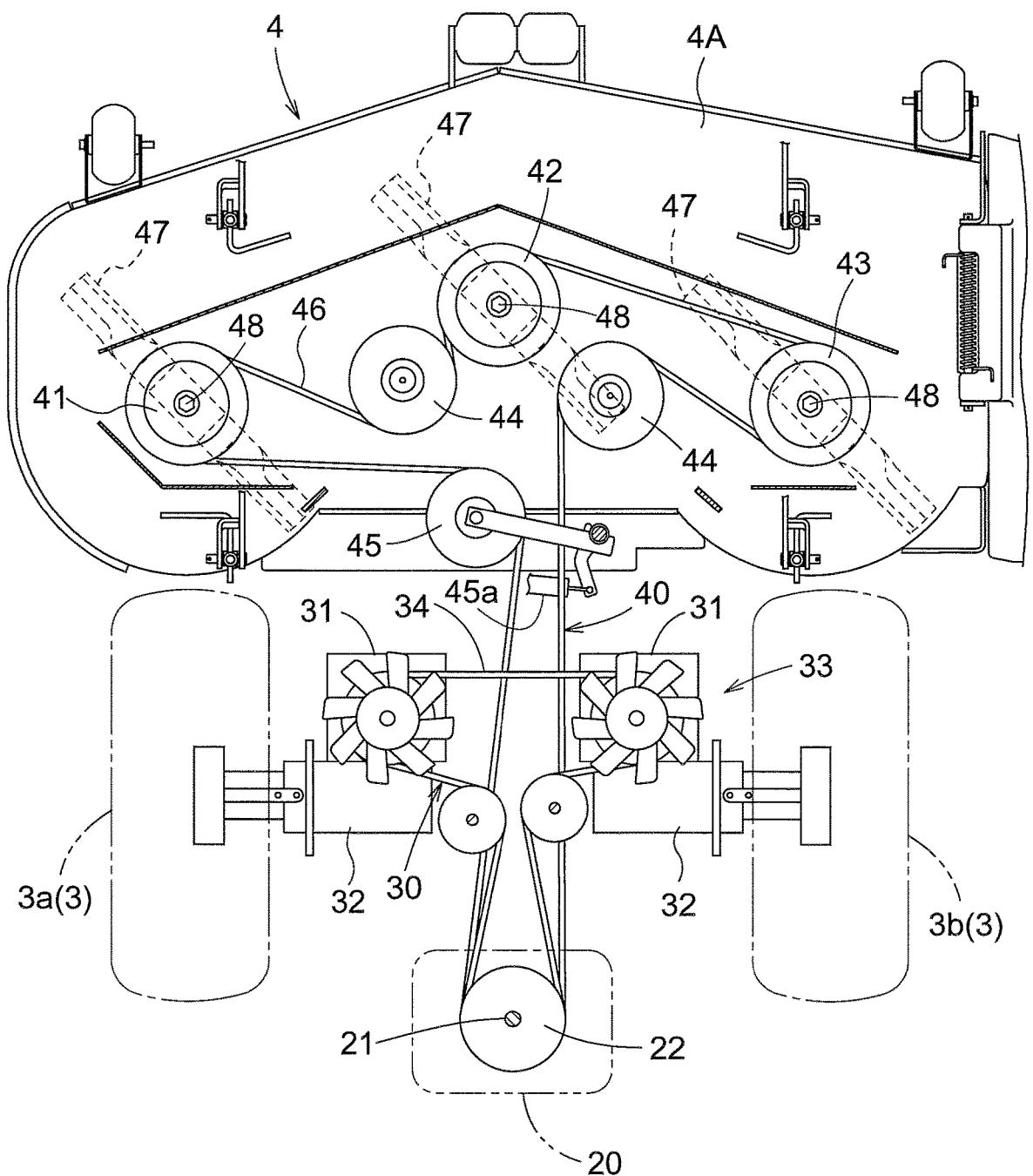
FIG. 2 is a plan view showing power transmission route of the grass mower.

Next, a grass mower as one embodiment of a work vehicle relating to the present invention will be explained with reference to the accompanying drawings. FIG. 1 is a perspective view of the grass mower. FIG. 2 is a power system diagram of the grass mower. Incidentally, in this detailed description, unless indicated explicitly otherwise, a word "front" means the front (forward) side in a vehicle front-rear direction (traveling direction) and a word "rear" means the rear side with respect to the vehicle front-rear direction (traveling direction). Further, a left-right direction or a transverse direction means a vehicle body transverse direction (vehicle body width direction) perpendicular to the vehicle body front-rear direction. A word "upper" or "lower" designates positional relationship with respect to the perpendicular direction of the vehicle body (vertical direction), indicative of a relationship regarding a ground-clearance height.

The grass mower includes a vehicle body 1 supported on a ground surface by means of a front wheel unit 2 as a caster unit and a rear wheel unit 3 as a traveling device. This grass mower is a so-called zero-turn mower, so that a left rear wheel 3a and a right rear wheel 3b together constituting the rear wheel unit 3 can be controlled in their forward and reverse directions as well as their speeds independently of each other. The front wheel unit 2 includes a left front wheel 2a and a right front wheel 2b. The principal component of the vehicle body 1 is a frame 10 consisting of angular pipe members, etc. Between the front wheel unit 2 and the rear wheel unit 3, a mower unit 4 as an implement (or utility implement) is suspended from the frame 10 to be liftable up/down.

The frame 10 extends in the front-rear direction and at the center portion of the frame 10, a driver's seat 12 is provided. On an upper face of a front portion of the frame 10, a floor plate is disposed to be used as a foot rest for a driver. At a front rear of the floor plate, a brake pedal 19 is provided.

An engine 20 for supplying rotational power to the rear wheel unit 3 and the mower unit 4 is mounted at a rear portion of the frame 10. The engine 20 consumes fossil fuel such as heavy oil, gasoline, etc. The engine 20 is disposed under a posture with its output shaft 21 (see FIG. 2) protruding downwards. On a lateral side of the engine 20, a fuel tank 16 is disposed.

Rearwardly of the driver's seat 12, an arch-shaped ROPS 17 is mounted vertically. On the left and right opposed sides of the driver's seat 12, fenders 15 are provided. On top faces of the fenders 15, user control devices such as various kinds of control levers, control buttons, etc. are disposed. On the top face of the left fender 15, a display unit 7 constituted as a meter panel is attached at a position readily seen from a driver seated at the driver's seat 12. On the top face of the right fender 15, a PTO clutch lever 18 is attached.

A maneuvering unit 13 as one of user operable devices consists of a left maneuvering lever 13a disposed on the left side of the driver's seat 12 and a right maneuvering lever 13b disposed on the right side of the driver's seat 12. The left maneuvering lever 13a is used for adjusting a rotational speed of the left rear wheel 3a. The right maneuvering lever 13b is used for adjusting a rotational speed of the right rear wheel 3b. The left maneuvering lever 13a and the right maneuvering lever 13b can be pivotally displaceable among/ across a forward speed changing range, neutral and a reverse speed changing range.

As shown schematically in FIG. 2, the power transmission line includes a traveling transmission mechanism 30 for transmitting engine power to the rear wheel unit 3 and a PTO transmission mechanism 40 for transmitting engine power to the mower unit 4. Power from the engine 20 is outputted via vertically two-stages of output pulleys 22 attached to the engine output shaft 21.

The traveling transmission mechanism 30 includes a pair of left and right HST (hydrostatic transmission) 31, a pair of left and right gear transmission mechanisms 32 and a traveling belt transmission mechanism 33. The traveling belt transmission mechanism 33 transmits power outputted from the output pulleys 22 to the HST(s) 31 via a traveling belt 34. The gear transmission mechanisms 33 transmit power speed changed by the HST(s) to the rear wheel unit 3 (left rear wheel 3a, right rear wheel 3b) as "rear wheels".

Speed changing operations of the left and right HST's 31 are effected according to control signals which are generated based on pivotal operations of the left maneuvering lever 13a and the right maneuvering lever 13b. In accordance with user operations on the left maneuvering lever 13a and the right maneuvering lever 13b, there are realized a stop state, a straight traveling state, a gentle turning state a pivot turning state and a spin turning state, respectively. The stop state is realized by stopping the left rear wheel 3a and the right rear wheel 3b. The straight traveling state is realized by forwardly driving or reversely driving the left rear wheel 3a and the right rear wheel 3b at an equal speed. The gentle turning state is realized by forwardly driving or reversely driving the left rear wheel 3a and the right rear wheel 3b at speeds different from each other. The pivot turning state is realized by stopping one of the left rear wheel 3a and the right rear wheel 3b and forwardly or reversely driving the other. The spin turning state is realized by forwardly driving one of the left rear wheel 3a and the right rear wheel 3b and reversely driving the other.

The mower unit 4 includes a mower deck 4A consisting of a top plate and a side plate. In an inner space of this mower deck 4A, as indicated by dotted lines in FIG. 2, there are provided three blades 47 disposed side by side in the vehicle body transverse direction. Each blade 47 is supported to a drive shaft 48 rotatably supported to the top plate of the mower deck 4A. In order to transmit power from the output pulley 22 of the engine 20 to the respective drive shaft 48, the PTO transmission mechanism 40 is provided. This PTO transmission mechanism 40 includes input pulleys 41, 42, 43 fixed to the drive shafts 48 of the respective blades 47, a direction changing pulley 44, a tension clutch pulley acting as a PTO clutch 45, and an implement belt 46 entrained around the above-cited members. With this arrangement in operation, each blade 47 is rotated at a rotational speed in direct proportion to an engine rotational speed. The PTO clutch 45 is switched into an engaged state or a disengaged state by means of a clutch solenoid 45a. This clutch solenoid 45a is magnetized in response to an ON operation of the PTO clutch lever 18, whereby the PTO clutch 45 is engaged. The clutch solenoid 45a is demagnetized in response to an OFF operation of the PTO clutch lever 18, whereby the PTO clutch 45 is disengaged.

Figure 3:
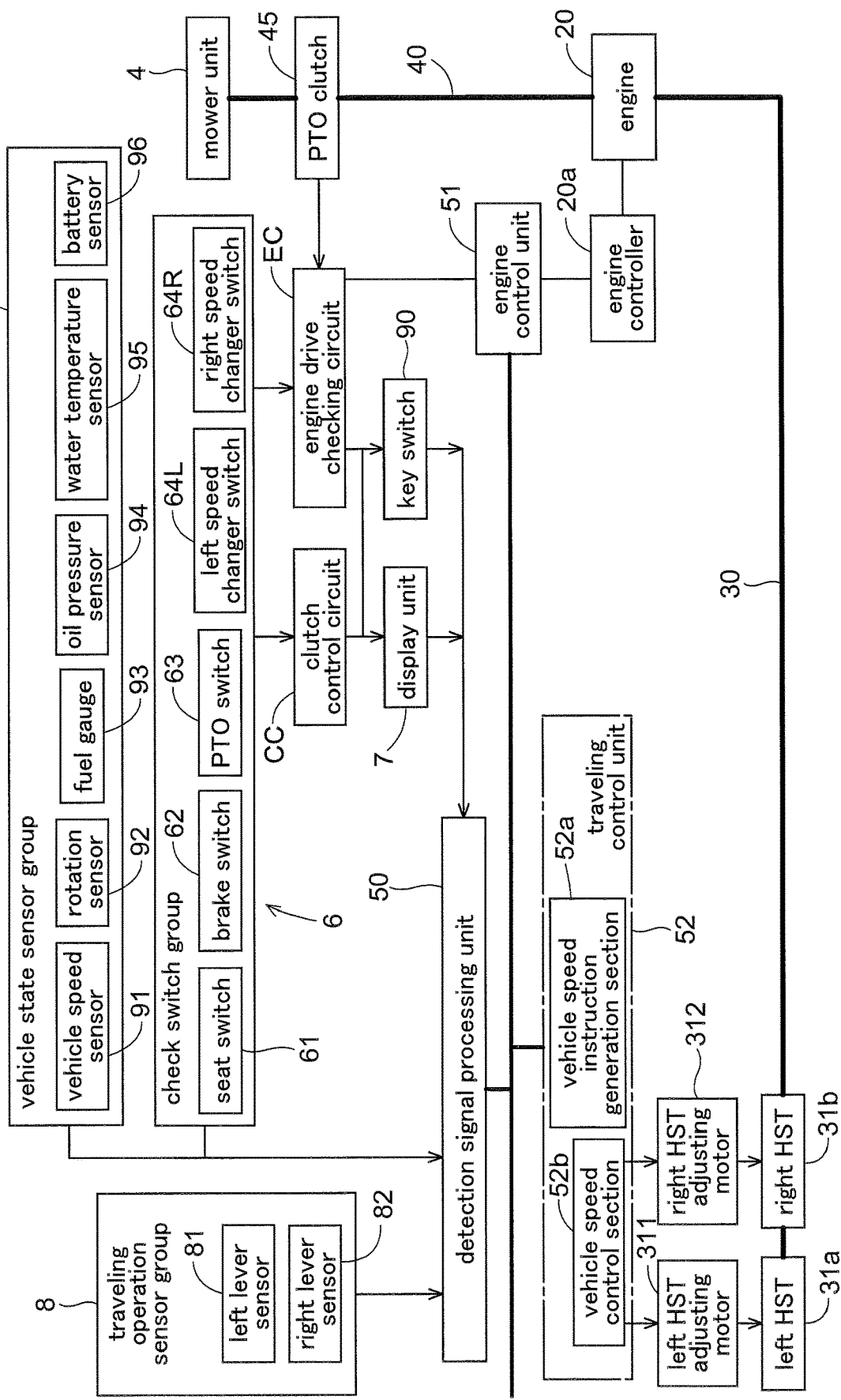
FIG. 3 is a functional block diagram of a control system of the grass mower.

A functional block diagram of a traveling control system of this grass mower is shown in FIG. 3. Core functional blocks in the traveling control system are a detection signal processing unit 50, an engine control unit 51 and a traveling control unit 52.

The detection signal processing unit 50 processes detection signals from a group of traveling operation sensors 8 and outputs result data. The traveling operation sensor group 8 includes a left lever sensor 81 for detecting a pivotal displacement of the left maneuvering lever 13a and a right lever sensor 82 for detecting a pivotal displacement of the right maneuvering lever 13b. In addition to these, the traveling operation sensor group 8 includes also an engine setting sensor for detecting a set value of an engine rotational speed setter (not shown) such as an accelerator lever, etc.

Further, to the detection signal processing unit 50, there is connected a key switch 90. The key switch 90, at its ON position, allows power supply to the respective electric devices and at a START position thereof, the engine 20 is started and at OFF position thereof, the engine 20 is stopped.

The engine control unit 51 controls driving of the engine 20 by giving control signals to an engine controller 20a. As this engine control unit 51 inputs various information relating to the engine 20, such as an engine rotational speed, a fuel supply amount, an oil pressure, an engine temperature, etc., then, based on such information, an abnormal state of the engine can be detected. Upon detection of such abnormal sate, an abnormal sate detection signal or an emergency signal for resolving the abnormal state will be outputted.

The traveling control unit 52 effects calculation processing of the detection result data outputted from the detection signal processing unit 50 and generates signals for operating the devices mounted on this grass mower. The traveling control unit 52 includes a vehicle speed instruction generation section 52*a* and a vehicle speed control section 52*b*.

The vehicle speed instruction generation section 52*a* and the vehicle speed control section 52*b* are provided in case maneuvering using the maneuvering unit 13 is effected by a by-wire method. In a further embodiment wherein such by-wire method is not used and the maneuvering unit 13 and the left and right HST's 31 are connected via physical linkage, the vehicle speed instruction generation section 52*a*, the vehicle speed control section 52*b*, a left HST adjusting motor 311, and a right HST adjusting motor 312 can be omitted. In the by-wire method, the vehicle speed instruction generation section 52*a* generates a vehicle speed instruction based on detection signals from the left lever sensor 81 and the right lever sensor 82 and gives this instruction to the vehicle speed control section 52*b*. Then, based on the vehicle speed instruction (left vehicle sped instruction, right vehicle speed instruction), the vehicle speed control unit 52*b* generates a control signal for controlling the rear wheel unit 3. More particularly, the control signal generated based on the left vehicle speed instruction is given to the left HST adjusting motor 311. With this, the swash plate angle of the left HST 31*a* is adjusted and the left rear wheel 3*a* is set to a vehicle speed based on the user operation. Similarly, the control signal generated based on the right vehicle speed instruction is given to the right HST adjusting motor 312. With this, the swash plate angle of the right HST 31*b* is adjusted and the right rear wheel 3*b* is set to a vehicle speed based on the user operation.

In the functional block diagram of FIG. 3, there are shown a clutch control circuit CC and an engine drive checking circuit EC. The clutch control circuit CC has a function of switching OFF (power disconnection) the PTO clutch 45 of the PTO transmission mechanism 40 at the time of abnormal operation of the engine. The engine drive checking circuit EC has a function for safely driving the engine 20 and a function of displaying any inconvenient conditional event for driving the engine 20. The clutch control circuit CC and the engine drive checking circuit EC are connected to a group of check switches 6, the display unit 7, the key switch 90 and the engine controller 20*a*.

The check switch group 6 generically refers to a group of check switches for use in checking safe states and no-safe states for safe driving of the engine 20 and each of these switches is selectively switched to either a safe position (closed position of the switch) corresponding to the safe state or a non-safe position (opened position of the switch). In the instant embodiment, the check switch group 6 includes a seat switch 61, a PTO switch 62, a brake switch 63, and a speed changer switch 64. In a different embodiment, at least one of the seat switch 61, the PTO switch 62, the brake switch 63 and the speed changer switch 64 may be omitted or other switch(es) than these can be included in the check switch group 6 also if desired.

The seat switch 61 is disposed at the driver's seat 12 and detects whether a driver is seated at the driver's seat 12 (switch closed: ON) or not (switch opened: OFF). The PTO switch 62 includes a first switch portion 62*a* and a second switch portion 62*b* which respectively are switched over in the switch state in association with an operation on the PTO clutch lever 18. In response to an ON (power transmission) operation on the PTO clutch lever 18, the first switch portion 62*a* is opened and the second switch portion 62*b* is closed. In response to an OFF (no power transmission or transmission disconnection) operation on the PTO clutch lever 18, the first switch portion 62*a* is closed and the second switch portion 62*b* is opened.

The brake switch 63 detects whether a brake (not shown) operably by an operation on the brake pedal 19 is under a braking state (switch closed: ON) or a non-braking state (switch opened: OFF). The speed changer switch 64 consists of a left speed changer switch 64L for detecting whether the left HST 31 as the left speed changer device is under a neutral state (switch closed: ON) or non-neutral state (switch opened: OFF) and a right speed changer switch 64R for detecting whether the right HST 31 as the right speed changer device is under a neutral state (switch closed: ON) or non-neutral state (switch opened: OFF).

Figure 4:
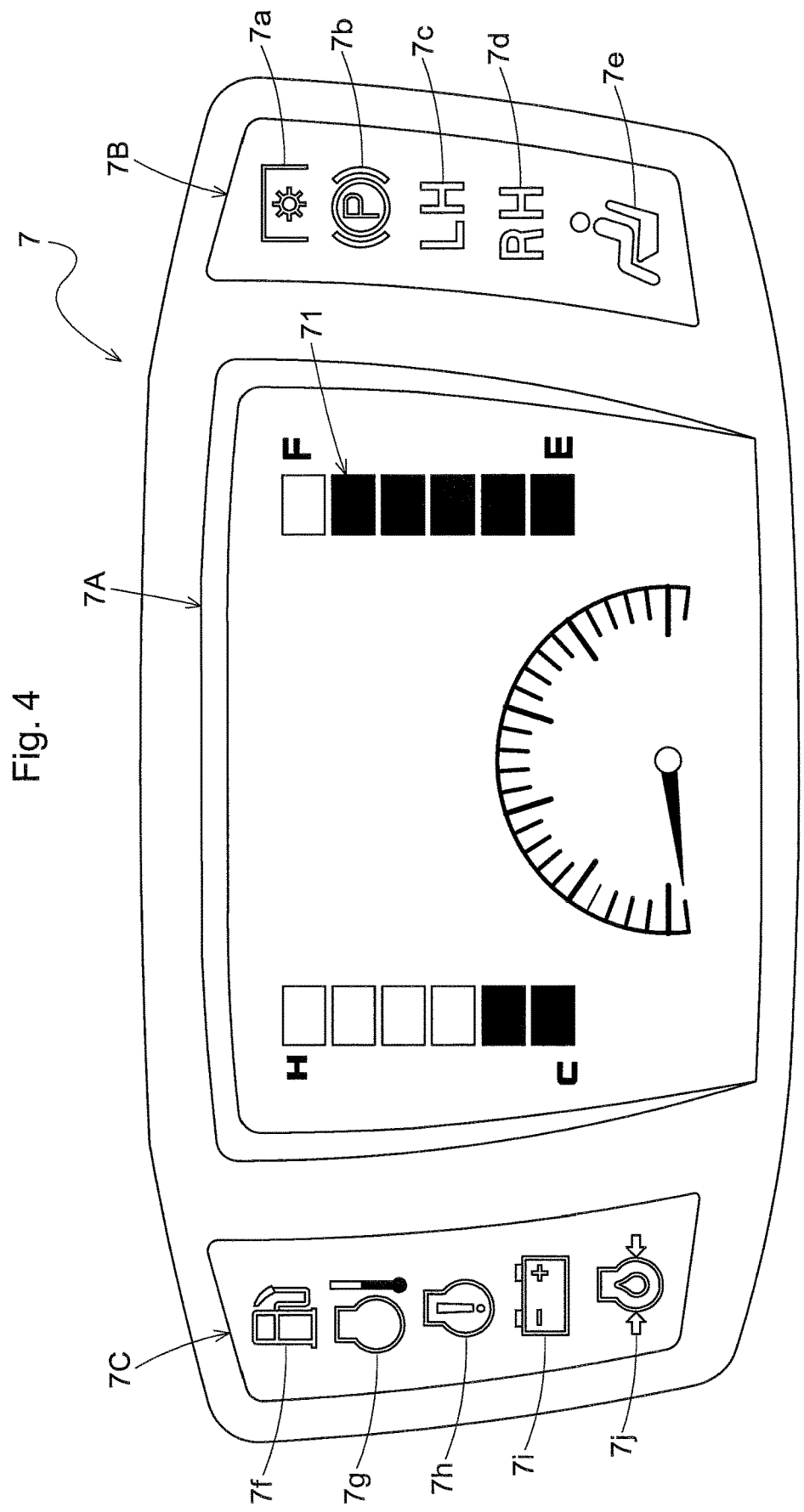
FIG. 4 is a screen view showing one example of screen of a display unit.

In the instant embodiment, the display unit 7, as shown in FIG. 4, consists of a center meter portion 7A, a right LED lamp display portion 7B located on the right side of this meter portion 7A and a left LED lamp display portion 7C located on the left side of the same. In the meter portion 7A, there are provided a semi-circular meter for displaying an engine rotational speed, a left vertical meter for displaying water temperature of engine cooling water, and a right vertical meter for displaying a remaining fuel amount inside the fuel tank.

The right LED lamp display portion 7B is used as a display for displaying switch states of the check switch group 6, in which a first LED 7*a*, a second LED 7*b*, a third LED 7*c*, a fourth LED 7*d*, and a fifth LED 7*e* are disposed in this order from the upper side. All of these are green LED lamps. In the instant embodiment, the first LED 7*a* is provided with an icon indicating the non-transmitting state of the PTO transmission mechanism 40, the second LED 7*b* is provided with an icon indicating the ON state of the brake, the third LED 7*c* is provided with an icon indicating the neutral state of the left maneuvering lever 13*a* (characters "LH"), the fourth LED 7*d* is provided with an icon indicating the neutral state of the right maneuvering lever 13*b* (characters "RH"), and the fifth LED 7*e* is provided with an icon indicating seated state of a driver. With illumination of the respective LED lamps of the right LED lamp display portion 7B, it can be confirmed that safe driving of the engine 20 is possible. For instance, if the third LED 7*c* and the fourth LED 7*d* are illuminated to display the left neutral icon and the right neutral icon respectively, this means that the left maneuvering lever 13*a* and the right maneuvering lever 13*b* are under the neutral states. Therefore, under this state, even if the engine 20 is started by operating the key switch 90, there is no risk of moving of the vehicle body 1. If either the left maneuvering lever 13*a* or the right maneuvering lever 13*b* is not under the neutral state, there exists possibility of moving of the vehicle body 1. So, safety control measure is provided not to allow driving of the engine 20 in such case. Thus, if the engine 20 is not driven in spite of an attempt for starting the engine 20 with operation of the key switch 90, by checking non-lit display, the driver can grasp the cause of this driving inability.

The left LED lamp display portion 7C is used as an alarm display portion (third display area) for displaying alarm data indicating results relating to alarm, in which a sixth LED 7*f*, a seventh LED 7*g*, an eighth LED 7*h*, a ninth LED 7*i*, and a tenth LED 7*j* are disposed in this order from the upper side. All of these are red LED lamps. In the instant embodiment, the sixth LED 7*f* is provided with an icon indicating fuel depletion, the seventh LED 7*g* is provided with an icon indicating overheating, the eighth LED 7h is provided with an icon indicating engine problem, and the ninth LED 7i is provided with an icon indicating insufficient battery charge, and the tenth LED 7j is provided with an icon indicating oil pressure shortage, respectively.

The key switch 90 includes a G terminal, an M terminal, a B terminal, an L terminal and an S terminal, the G terminal being the ground terminal. When the key switch 90 is at its OFF position, the G terminal and the M terminal are connected, the B terminal is connected to the battery B, the L terminal is connected to a first power supply control line E1 and the S terminal is connected to a second power supply control line E2. When the key switch 90 is at its ON position, the B terminal and the L terminal are connected. When the key switch 90 is at its START position, the B terminal, the L terminal and the S terminal are connected to each other.

Figure 5:
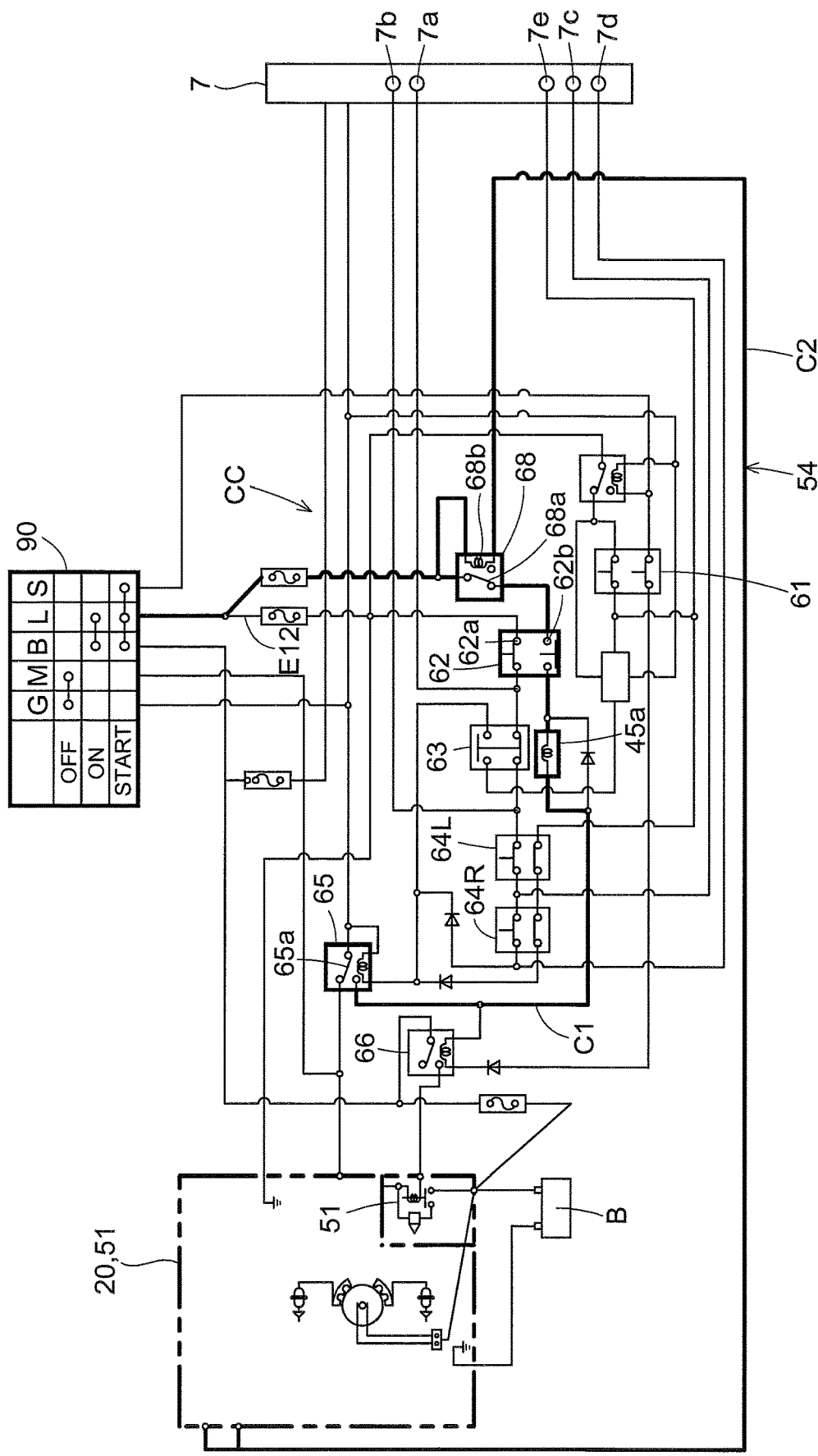
FIG. 5 is an electric circuit diagram showing a clutch control circuit with emphasis.

In FIG. 5, there is shown an electric circuit provided among the check switch group, the engine control unit 51, the key switch 90, the display unit 7 and the PTO clutch 45. In this electric circuit, there are included a clutch control circuit CC and an engine drive checking circuit EC. In the electric circuit shown in FIG. 5, the constituent elements of the clutch control circuit CC are shown with emphasis.

Next, the clutch control circuit CC will be explained with reference to FIG. 5. The clutch control circuit CC includes the clutch solenoid 45a, a clutch relay 68, a clutch power supply line C1, a clutch control line C2, and so on.

The clutch solenoid 45a is incorporated in the clutch power supply line C1. When the clutch power line C1 is supplied with power, a current flows to the clutch solenoid 45a, thus magnetizing this clutch solenoid 45a. With this, the PTO clutch 45 is rendered ON. When the clutch power line C1 is not supplied with power, no current flows to the clutch solenoid 45a, so the PTO clutch 45 is rendered OFF. The clutch relay 68 is a clutch switch for switching over between power supply/no power supply to the clutch solenoid 45a. A switch portion 68a of the clutch relay 68 is connected to the clutch power supply line C1 and a coil portion 68b of the clutch relay 68 is connected to the clutch control line C2.

The clutch power supply line C1 incorporates the above-mentioned PTO switch 62, and the clutch power supply line C1 is connected to a second switch portion 62b of the PTO switch 62. Thus, in association with an ON operation of the PTO clutch lever 18, the second switch portion 62b is closed, thus allowing passage of the current flowing through the clutch power supply line C1. Conversely, in association with an OFF operation of the PTO clutch 18, the second switch portion 62b is opened, thus blocking the current flowing through the clutch power supply line C1.

One end of the clutch control line C2 is connected to the L terminal of the key switch 90 and the other end thereof is connected to an external output terminal of the engine control unit 51. One end of the clutch power supply line C1 is connected to a terminal of a switch portion 65a of a first relay 65 used in engine drive control which will be detailed later and the other end thereof is connected to the L terminal of the key switch 90. The clutch power supply line C1 incorporates the switch portion 68a of the clutch relay 68 and the clutch solenoid 45a.

When the key switch 90 is at the ON position or the START position, the L terminal is connected to the battery B. So, if the external output terminal of the engine control unit 51 is grounded, power is supplied to the clutch control line C2. With this, the switch portion 68a of the clutch relay 68 is rendered OFF, thus blocking power supply to the clutch solenoid 45a and the PTO clutch 45 is rendered to power transmission blocking state. When the external output terminal of the engine control unit 51 is opened, no power is supplied to the clutch control line C2 and the switch portion 68a of the clutch relay 68 is switched ON. Further, at the switch portion 65a of the first relay 65, if the clutch power supply line C1 is connected to the ground, power is supplied to the clutch power supply line C1, thus rendering the PTO clutch 45 into power transmission state.

The engine control unit 51 keeps the external output terminal open when the engine 20 is under the normal state. However, upon detection of abnormality in the engine 20 such as abnormal load fuel pump failure, etc., the engine control unit 51 switches the external output terminal to the grounded state. With this, power is supplied to the clutch control line C2 and the clutch power supply line C1 is blocked by the clutch relay 68. Namely, when the engine 20 becomes abnormal, the PTO clutch 45 is switched to the power transmission blocking state automatically, whereby drive of the mower unit 4 is stopped, thus avoiding secondary damage in the traveling work due to such engine trouble.

In the foregoing embodiment, it was explained with citing the starter ST as the engine controller 20a. However, the engine controller 20a includes, in addition thereto, an igniter, a fuel injection pump, and a fuel valve, and for these devices too, like the starter ST, power supply control is effected under the switched states of the check switch group 6.

In the foregoing embodiment, a grass mower was cited as a work vehicle. However, the present invention is applicable also to various work vehicles such as a snow plowing vehicle, a liquid agent spraying vehicle, etc.

The invention claimed is:

1. A work vehicle having an implement, the work vehicle comprising:
   an engine;
   an engine control unit controlling the engine and detecting an abnormal state of the engine;
   a traveling transmission mechanism transmitting power from the engine to a traveling device;
   a PTO transmission mechanism transmitting power from the engine to the implement;
   a PTO clutch switching ON/OFF power transmission by the PTO transmission mechanism; and
   a clutch control circuit configured to render the PTO clutch OFF based on a detection signal outputted by the engine control unit at time of detection of the abnormal state,
   wherein the clutch control circuit includes a clutch power supply line supplying power for a clutch operation of the PTO clutch, the clutch power supply line incorporating a clutch switch configured to block power supply by the clutch power supply line in response to the detection signal.

2. The work vehicle of claim 1, wherein the clutch switch comprises a relay switch, and a coil of the relay switch is incorporated in a control line for transmitting the detection signal.

3. The work vehicle of claim 2, wherein one end of the control line is connected to the engine control unit, the other end thereof is connected to the clutch power supply line and the detection signal comprises a ground signal.

4. A work vehicle having an implement, the work vehicle comprising:
   an engine;
   an engine control unit controlling the engine and detecting an abnormal state of the engine;

a traveling transmission mechanism transmitting power from the engine to a traveling device;

a PTO transmission mechanism transmitting power from the engine to the implement;

a PTO clutch switching ON/OFF power transmission by the PTO transmission mechanism, the PTO clutch comprising an electromagnetic solenoid; and a clutch control circuit configured to automatically render the PTO clutch OFF due to a detection signal outputted by the engine control unit at time of detection of the abnormal state.

5. The work vehicle of claim 4, wherein the clutch control circuit includes a clutch power supply line supplying power for a clutch operation of the PTO clutch, the clutch power supply line incorporating a clutch switch configured to block power supply by the clutch power supply line in response to the detection signal.

6. The work vehicle of claim 5, wherein the clutch switch comprises a relay switch, and a coil of the relay switch is incorporated in a control line for transmitting the detection signal.

7. The work vehicle of claim 6, wherein one end of the control line is connected to the engine control unit, the other end thereof is connected to the clutch power supply line and the detection signal comprises a ground signal.

\* \* \* \* \*